United States Patent Office 2,970,262
Patented Jan. 31, 1961

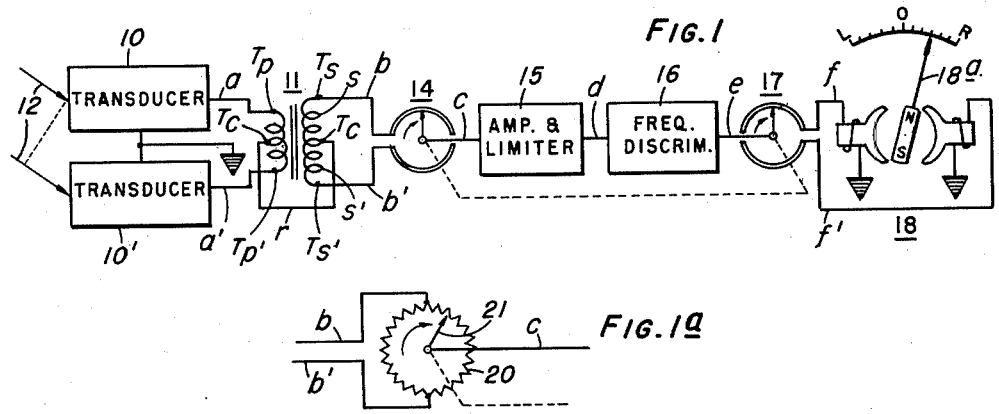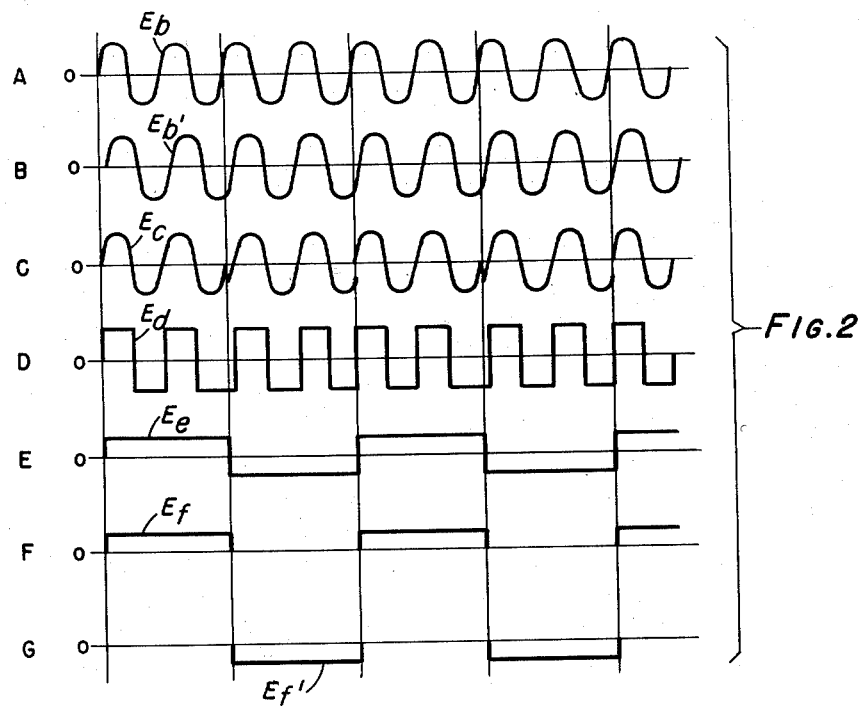

2,970,262
PHASE DETECTION

Wallace H. Haase, Northridge, Calif., assignor to The Bendix Corporation, a corporation of Delaware Filed June 12, 1957, Ser. No. 665,151

11 Claims. (Cl. 324—83)

This invention relates to systems for amplifying and detecting phase differences between two A.C. potentials of the same frequency.

An object of the invention is to increase the sensitivity of a system for measuring phase differences.

Another object is to provide a simple and reliable system for detecting phase differences.

Other more specific objects and features of the invention will appear from the description to follow.

The invention is based in part on the principle that a phase change in an alternating potential involves a transient frequency change, and provides a system for deriving from alternating potentials a third alternating potential having a frequency modulation proportional to the phase difference between the first two potentials, and measuring the frequency modulation. The third alternating potential is derived by alternately applying the first two potentials to a common circuit at a repetition rate less than the frequency of the first two potentials. The third alternating potential in the common circuit therefore periodically shifts back and forth in phase at the repetition rate to the extent of the phase difference between the first two potentials, and each phase shift produces a transient frequency shift. The average frequency shift $\Delta F$ is represented by the equation:

$$\Delta F = f \Delta \theta$$

where:
$f$ is the repetition rate;
$\Delta \theta$ is the phase shift.

Since successive frequency shifts in the third potential are in opposite directions, the D.C. output of a conventional frequency discriminator to which the third wave is applied will reverse in polarity at the repetition rate to produce an alternating current of the repetition frequency and of amplitude proportional to the frequency shift. If the direction of the phase shift is known, or is immaterial, the output of the frequency discriminator can be applied to an A.C. meter or can be rectified and applied to a D.C. meter to indicate the magnitude of phase shift. If the direction of the phase shift is to be determined, the output may be synchronously switched (at the repetition frequency) to different terminals of a center zero meter or equivalent device to indicate both the magnitude and the direction of the phase shift.

Further in accordance with the invention, I increase the sensitivity of measurement of small phase shifts by amplifying the phase shift before treating the waves as above described. This is accomplished by a circuit which derives from the output potentials their in-phase and quadrature components, differently amplifies or attenuates the two components, and recombines them to produce output potentials of greater phase difference.

A full understanding of the invention may be had from the following detailed description with reference to the drawing, in which:

Fig. 1 is a schematic circuit diagram of an embodiment of the invention.

Fig. 1a is a schematic circuit diagram of an alternative switching device that may be used in Fig. 1.

Fig. 2 is a series of curves illustrating the operation of Fig. 1.

Figure 3:
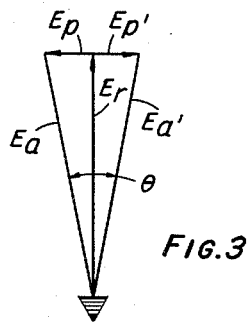
Figs. 3 and 4 are vector diagrams illustrating the operation of the phase-amplifying circuit incorporated in Fig. 1.

There are shown in Fig. 1 two sources 10 and 10' of electric waves of the same frequency but different phase. The sources may be transducers responsive to sound or other traveling space waves, the angle of approach of which is to be measured by measuring the phase difference between the outputs of the transducers 10 and 10', respectively. Thus, incoming space waves in the direction indicated by the arrows 12 will impinge on the transducer 10 ahead of transducer 10', so that the electric wave generated in the transducer 10' will lag that generated in the transducer 10 by an electrical phase angle that is a function of the wavelength of the space waves and the spacing between the transducers 10 and 10'.

The outputs of the sources 10 and 10' appearing on the conductors $a$ and $a'$, respectively, may be passed through a phase-amplifying circuit including a transformer 11, and applied to conductors $b$ and $b'$, respectively. Alternatively, if no phase amplification is necessary or desired, the conductors $a$ and $a'$ may be connected directly to the conductors $b$, $b'$, respectively.

The waves appearing on conductors $b$ and $b'$, respectively, are alternately applied by a suitable switching device, shown for convenience of illustration as a rotating commutator 14, to a conductor $c$. The commutator 14 operates at a rate less than the frequency of the waves on conductors $b$ and $b'$. Thus, if the frequency of those waves is 20 kilocycles, the commutator 14 might operate at 10,000 revolutions per second. The resultant wave on conductor $c$ may be amplified and limited to produce substantially square waves by an amplifier and limiter 15, and the resultant wave on conductor $d$ is supplied to a frequency discriminator 16.

Referring now to Fig. 2, curves A and B thereof represent the waves of the same frequency but different phase appearing on conductors $b$ and $b'$, respectively. It will be observed that the wave $E_{b'}$ lags the wave $E_b$ in phase. The wave appearing on conductor $c$ is shown in curve C. It will be observed that for alternate periods of approximately two cycles duration, the wave in curve C corresponds to curve A, and during the other alternate intervals it corresponds to curve B. During each transition from curve A to curve B, the phase is retarded, and during each transition from curve A to curve B the phase is advanced. These phase shifts produce alternate decreases and increases in the frequency of wave $E_c$ in accordance with the formula previously given. No attempt has been made to illustrate these frequency changes in curve C.

Curve D shows the waveform on conductor $d$. In accordance with well known practice, the amplifier and limiter 15 has converted the sinusoidal waveform of curve C to the substantially square-topped waveform shown in curve D. It is to be understood, however, that the essentially sinusoidal waveform $E_c$ may be applied to the frequency discriminator 16 if the usual advantages of a limiter, such as eliminating amplitude modulation, are not desired.

The frequency discriminator 16 may be of a well known type which delivers zero output at a predetermined frequency, and delivers a negative current in response to frequencies below the predetermined value, and delivers a positive current in response to frequencies above the predetermined value, or vice versa. Curve E shows the nature of the output of the frequency discriminator on the conductor $e$ when the discriminator has a positive output for frequencies above the predetermined level and a negative ouput in response to frequencies below the predetermined level. It will be observed that curve E is a square alternating wave of the frequency of the commutator 14. The amplitude of the potential $E_e$ is a function of the magnitude of the phase shift between curve A and curve B and the frequency of the commutator 14. If it is only desired to know the amplitude of the phase shift, it is merely necessary to measure the average amplitude of the alternating current $E_e$, which may be done directly with an A.C. meter or by first rectifying the alternating current and then measuring the rectified current with a D.C. meter.

However, it is often desired to indicate not only the magnitude of the phase difference between the curves $E_b$ and $E_{b'}$, but also the direction of the shift. This may be accomplished by switching the output on conductor $e$ to an indicating device 18 by means of a switch 17 which is operated in synchronism with the input switch 14, so that one set of half waves of curve E is applied to one conductor $f$, and the other alternate set of half waves is applied to a conductor $f'$. The result is, as shown in curves F and G of Fig. 2, that one predetermined set of half waves is always applied to the conductor $f$, and the other set of half waves is always applied to the conductor $f'$.

The indicating device 18 may be an instrument of a well known type in which a pointer 18a is in a center or zero position when no potential is applied to the instrument, but moves to the right of the center position in response to either a positive potential on conductor $f$ or a negative potential on conductor $f'$, and moves to the left of center in response to a negative potential on conductor $f$ or a positive potential on conductor $f'$. Under the conditions illustrated by curves F and G of Fig. 2, positive pulses will be applied to conductor $f$ and negative pulses will be applied to conductor $f'$, causing the pointer 18a to move to the right from the center position, indicating that the wave of curve A leads the wave of curve B in Fig. 2. In the direction-indicating system as shown, the indicating device 18 may be calibrated directionally with the letters L and R, as indicated, to indicate directly the direction of approach of space waves to the transducers 10 and 10'. If the phase shift were reversed, that is, if the wave $E_b$ lagged the wave $E_{b'}$ instead of leading it, the pulses in curve F would be negative instead of positive, and the pulses of curve G would be positive instead of negative, thereby producing the opposite directional indication on the indicating device 18.

It is to be understood that it is not essential to the present invention that the switching device 14 be of the particular type shown in Fig. 1, which instantaneously switches the conductor $c$ between conductors $b$ and $b'$ to produce the abrupt transitions in curve C (Fig. 2) and the square-topped waves of curve E. As an example, the switch 14 of Fig. 1 can be replaced by a potentiometer as shown in Fig. 1a, in which the lines $b$ and $b'$ are connected to diametrically opposite taps on a circular resistor 20, swept by a rotating brush 21 connected to the line $c$. With the arrangement of Fig. 1a, the waves of curves E, F and G of Fig. 2 can be sinusoidal instead of square, but the over-all results would be the same.

Referring now to the phase-amplifying transformer 11, it will be observed that it comprises a primary winding having a center tap $T_c$ and end taps $T_p$ and $T_{p'}$ connected to the lines $a$ and $a'$, respectively. The secondary winding of the transformer has a center tap connected, by a conductor $r$, to the center tap $T_c$ of the primary, and end taps $T_s$ and $T_{s'}$, connected to the lines $b$ and $b'$, respectively. The operation of the transformer is illustrated by the vector diagrams of Figs. 3 and 4.

Referring to Fig. 3, the potentials from the two transducers 10 and 10a are potentials $E_a$ and $E_{a'}$ of equal amplitude, but differing by the phase angle $\theta$. Potentials $E_a$ and $E_{a'}$ are applied to the primary taps $T_p$ and $T_{p'}$ of the transformer, and the resultant potentials between the center tap $T_c$ and the primary taps $T_p$ and $T_{p'}$ are represented by the two equal and opposite vectors $E_p$ and $E_{p'}$. The potential between ground (the junction between the sources 10 and 10') and the midtap $T_c$ is represented by the vector $E_r$ bisecting the angle $\theta$ and normal to the vectors $E_p$ and $E_{p'}$. The vector sum of $E_r$ and $E_p$ is $E_a$, and the vector sum of $E_r$ and $E_{p'}$ is $E_{a'}$.

Figure 4:
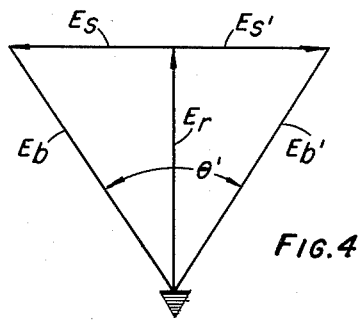

Referring to Fig. 4, since the midtaps of the primary and secondary windings are directly interconnected, the potential at the secondary midtap is represented by the same vector $E_r$. The potentials induced between the center tap $T_c$ and the secondary taps $T_s$ and $T_{s'}$ are in phase with the potential across the primary and are therefore represented by the two vectors $E_s$ and $E_{s'}$, respectively, which are of greater magnitude than the vectors $E_p$ and $E_{p'}$, because of the turns ratio of the transformer. The resultant potentials $E_b$ and $E_{b'}$ appearing between ground and the secondary taps $T_s$ and $T_{s'}$ are applied to the lines $b$ and $b'$, respectively. It will be observed that the phase angle $\theta'$ between $E_b$ and $E_{b'}$ is greater than the angle $\theta$ between $E_a$ and $E_{a'}$, because vectors $E_s$ and $E_{s'}$ are of greater magnitude than vectors $E_p$ and $E_{p'}$, whereas $E_r$ is of the same magnitude in each case. Therefore, the phase difference has been amplified. Nf the primary had more turns than the secondary, the phase difference would be reduced. The transformer 11 can be an auto transformer having a single winding with primary and secondary tape thereon, and the same results will be achieved.

It will be observed that essentially the phase-transforming circuit of Fig. 1 comprises the combination of a means (the primary winding of transformer 11) for developing a mean phase potential $E_r$ between the common terminal (ground) and the conductor $r$, which will be referred to as a reference conductor, and a means (the primary and secondary windings together) for developing between the reference conductor $r$ and the output terminals (the lines $b$ and $b'$) two potentials $E_s$ and $E_{s'}$ in phase opposition to each other and in phase quadrature to the mean phase potential. The output potential $E_b$ on the line $b$ is thus the vector sum of $E_r$ and $E_s$, and the output potential on the line $b'$ is the vector sum of $E_r$ and $E_{s'}$. In order that the phase angle $\theta'$ be an amplified function of the angle $\theta$, the ratio of $E_s$ and $E_{s'}$ to $E_r$ in Fig. 4 must be greater than the ratio of $E_p$ and $E_{p'}$ to $E_r$ in Fig. 3. In Fig. 1, this is accomplished by stepping up the quadrature potentials $E_p$ and $E_{p'}$ to the higher potentials $E_s$ and $E_{s'}$ with the transformer. However, it can also be accomplished by reducing the magnitude of $E_r$.

Figure 5:
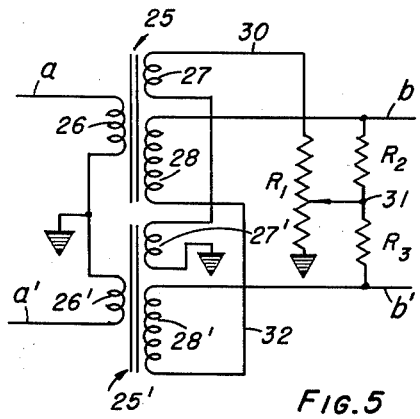
Fig. 5 is a schematic circuit diagram of an alternative phase-transforming circuit that can be used in the system of Fig. 1.

An alternative system is shown in Fig. 5, in which the primary circuits of the transformer are completely separate from the secondary circuits. Here, two separate transformers 25 and 25' are provided. The primary winding 26 of transformer 25 is connected between the conductor $a$ and ground, and the primary winding 26' of transformer 25' is connected between the line $a'$ and ground. Therefore, the transformer 25 is energized by the potential $E_a$, and the transformer 25' is energized by the potential $E_{a'}$. The transformer 25 has two secondary windings 27 and 28 and the transformer 25' has two secondary windings 27' and 28'. The two secondary windings 27' and 27 are connected in series-aiding relation from ground through a potentiometer $R_1$ back to ground. The two secondary windings 28 and 28' are connected in series-opposing relation by a reference conductor 32, between the output lines $b$ and $b'$. There is bridged across the lines $b$ and $b'$ a voltage divider consisting of two equal resistors $R_2$ and $R_3$, the junction 31 of which is connected to the movable contact of the potentiometer $R_1$.

Figure 6:
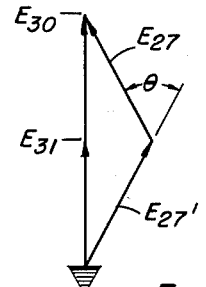
Figs. 6 and 7 are vector diagrams illustrating the operation of the phase-amplifying circuit of Fig. 5.

Referring to Fig. 6, the potentials across the series-connected secondary windings 27' and 27 are represented by vectors $E_{27'}$ and $E_{27}$, respectively. The vector sum of these potentials between ground and the conductor 30 is represented by the vector $E_{30}$ of mean phase with respect to the potentials $E_{27'}$ and $E_{27}$. The potential between ground and the point 31 is represented by the vector $E_{31}$, which is in phase with the vector $E_{30}$ but is of lesser magnitude, the magnitude depending upon the adjustment of the potentiometer $R_1$.

Figure 7:
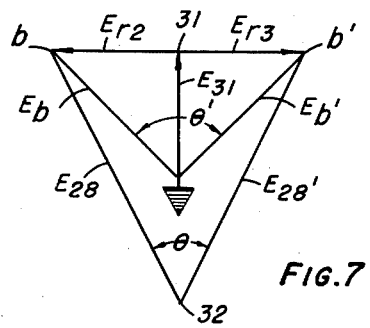

Referring now to Fig. 7, the potential across the secondary winding 28 is represented by the vector $E_{28}$, and the potential across the secondary winding 28' is represented by the vector $E_{28'}$. The phase angle between these two vectors is the angle $\theta$ representing the phase difference between the potentials $E_a$ and $E_{a'}$. These vectors $E_{28}$ and $E_{28'}$ indicate the potentials existing between the reference conductor 32 and the output lines $b$ and $b'$, respectively. The potential between the lines $b$ and $b'$ is the sum of two quadrature potentials $E_{r2}$ and $E_{r3}$. The potential of conductor $b$ with respect to ground is the vector sum of the potential $E_{31}$ and the vector $E_{r2}$, whereas the potential between ground and the output line $b'$ is the vector sum of the mean phase potential $E_{31}$ and the quadrature potential $E_{r3}$. These potentials are represented by the vectors $E_b$ and $E_{b'}$ in Fig. 7. The phase angle between $E_b$ and $E_{b'}$ is the angle $\theta'$ which is greater than the angle $\theta$.

It will be observed that the angle $\theta'$ is a function of the value of the potential $E_{31}$ relative to the potentials $E_{r2}$ and $E_{r3}$. The potential $E_{31}$ is a function of the number of turns on the secondary windings 27 and 27', and the adjustment of the potentiometer $R_1$. The magnitudes of the quadrature potentials $E_{r2}$ and $E_{r3}$ are functions of the number of turns in the windings 28 and 28'.

It has been previously mentioned in connection with the transformer 11 of Fig. 1 that the phase difference can be reduced, instead of amplified, by having more turns on the primary than the secondary. The same effect can be obtained with the circuit of Fig. 5, by reducing the number of turns on the secondary windings 28, 28', relative to the secondary windings 27, 27'. It may sometimes be desirable in practice to reduce a phase difference.

Although for the purpose of explaining the invention a particular embodiment thereof has been shown and described, obvious modifications will occur to a person skilled in the art, and I do not desire to be limited to the exact details shown and described.

I claim:

1. Apparatus for detecting phase difference between two electric waves of the same frequency comprising: frequency-discriminating means responsive to an input alternating potential to deliver zero output at a predetermined input frequency and a direct current output of one polarity at input frequencies above said predetermined frequency, of the other polarity at input frequencies below said predetermined frequency, and of amplitude proportional to the extent of departure of the input frequency from said predetermined frequency; and input switching means for alternately applying said two waves to said discriminating means at a repetition rate less than the frequency of said waves, whereby the output of the discriminator includes an alternating potential of the frequency of said repetition rate and amplitude proportional to the phase difference between said electric waves.

2. Apparatus according to claim 1 including indicating means connected to said frequency-discriminating means for indicating the amplitude of said alternating potential in said output.

3. Apparatus according to claim 1 including indicating means connected to said frequency-discriminating means for indicating the polarity of a predetermined set of alternate half cycles of said alternating potential.

4. Apparatus according to claim 3 in which said indicating means comprises a polarity-indicating device, and output switching means synchronized with said input switching means for applying said predetermined set of alternate half cycles of said alternating potential to said device.

5. Apparatus according to claim 4 in which said polarity-indicating device has two input terminals and has like response to potentials of opposite polarities on said respective terminals, and said output switching means applies said predetermined set of alternate half cycles to one input terminal and the other set of alternate half cycles to the other input terminal.

6. Apparatus for producing from two input alternating potentials differing in phase by one angle, two output alternating potentials differing by a second phase angle different from but a function of said one angle, said apparatus comprising: a common terminal, two output terminals, and a reference conductor; first means for developing from said input potentials a third potential of mean phase and applying it between said common terminal and said reference conductor; second means for developing from said input potentials and applying between said reference conductor and said respective output terminals fourth and fifth potentials in phase opposition with each other and in phase quadrature to said mean phase, whereby the output potential between said common terminal and one output terminal is the vector sum of said third and fourth potentials, and the output potential between said common terminal and the other output terminal is the vector sum of said third and fifth potentials.

7. Apparatus for deriving from two input alternating potentials of the same frequency and substantially the same amplitude, and differing in phase by one phase angle, two output alternating potentials of the same frequency but differing by a second phase angle different from but a function of said first phase angle, said apparatus comprising: means connecting said two input potentials in series-opposing relation to produce a third potential in phase quadrature to the mean phase angle of said two input potentials; means for deriving from said third potential fourth and fifth potentials in phase opposition to each other and of magnitude different from but a function of said third potential; means for deriving from said two input potentials a sixth potential of fixed magnitude relative thereto and of said mean phase angle; and means for combining said sixth potential with each of said fourth and fifth potentials to produce said two output alternating potentials.

8. Apparatus according to claim 7 in which said apparatus includes a transformer having a center tap and primary and secondary taps symmetrically disposed with respect to said center tap; said input potentials being connected in said opposing series relation between said primary taps whereby said third potential is impressed between said primary taps and said transformer constitutes said means for deriving said fourth, fifth and sixth potentials, said fourth and fifth potentials appearing between said center tap and the respective secondary taps, said sixth potential appearing between said center tap and the junction between said input potentials, and said two output potentials appearing between said junction of said respective secondary taps.

9. Apparatus according to claim 8 in which said transformer comprises two primary windings respectively connected between said center tap and said primary taps and two secondary windings respectively connected between said center tap and said secondary taps.

10. Apparatus according to claim 6 comprising first and second transformers respectively energized by said two input potentials and each having two secondary windings; said first means comprising a circuit including one secondary winding of each transformer connected in aiding relation to produce said third potential between said common terminal and said reference conductor; said second means comprising a circuit connecting the other secondary windings of said two transformers in series-opposing relation between said output terminals, and connecting said reference conductor to said output terminals through separate paths of equal impedance.

11. Apparatus according to claim 10 in which said separate paths are equal resistance elements connected between said reference conductor and said respective output terminals.

References Cited in the file of this patent

UNITED STATES PATENTS

| | | |
|---|---|---|
| 1,984,545 | Peterson | Dec. 18, 1934 |
| 2,192,709 | Lee | Mar. 5, 1940 |
| 2,527,096 | Howes | Oct. 24, 1950 |
| 2,577,668 | Wilmotte et al. | Dec. 4, 1951 |
| 2,617,025 | Hugenholtz | Nov. 4, 1952 |
| 2,725,528 | Werner | Nov. 29, 1955 |
| 2,774,038 | Stavis | Dec. 11, 1956 |